(12) United States Patent
Ouyang et al.

(10) Patent No.: US 11,271,605 B2
(45) Date of Patent: Mar. 8, 2022

(54) EXTERNAL INFORMATION ASSISTANT CHANNEL ASSESSMENT FOR BLUETOOTH ADAPTIVE FREQUENCY HOPPING

(71) Applicant: Google LLC, Mountain View, CA (US)

(72) Inventors: Xuemei Ouyang, Mountain View, CA (US); Jeffrey Kuramoto, Mountain View, CA (US); Jiang Zhu, Cupertino, CA (US); Wenjing Su, Mountain View, CA (US); Ke Dong, San Jose, CA (US); Seang Chau, Los Altos, CA (US); Chi Fai Yip, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/981,105

(22) PCT Filed: Nov. 12, 2019

(86) PCT No.: PCT/US2019/060928
§ 371 (c)(1),
(2) Date: Sep. 15, 2020

(87) PCT Pub. No.: WO2021/096491
PCT Pub. Date: May 20, 2021

(65) Prior Publication Data
US 2021/0234572 A1    Jul. 29, 2021

(51) Int. Cl.
*H04B 1/713*    (2011.01)
*H04B 1/715*    (2011.01)
(Continued)

(52) U.S. Cl.
CPC ........... *H04B 1/715* (2013.01); *H04B 17/318* (2015.01); *H04W 48/16* (2013.01);
(Continued)

(58) Field of Classification Search
CPC ............... H04B 1/715; H04B 17/318; H04B 2001/7154; H04W 74/0816; H04W 48/16; H04W 4/80
(Continued)

(56) References Cited

U.S. PATENT DOCUMENTS 8,706,038 B2    4/2014    Sharma
9,307,416 B2    4/2016    Ruuska et al.
(Continued)

FOREIGN PATENT DOCUMENTS

EP    3223577 A1    9/2017

OTHER PUBLICATIONS

International Search Report and Written Opinion for International Application No. PCT/US2019/060928 dated Jul. 14, 2020. 14 pages.

*Primary Examiner* — Don N Vo
(74) *Attorney, Agent, or Firm* — Lerner, David, Littenberg, Krumholz & Mentlik, LLP (57) ABSTRACT

A system and method is provided for improving signal quality in communications among fully wireless systems including a host device in wireless communication with a primary accessory which further wirelessly communicates with a secondary accessory. The host device generates information for use by the primary accessory in determining which channels have interference and should be avoided. The information may include an adaptive frequency hopping (AFH) channel map for communications between the host and the primary device, from which the primary device can infer which frequency bands have interference and generate a second AFH map for communications between the primary accessory and the secondary accessory accordingly. In other examples the information includes the second AFH map generated by the host, for example, based on an out-of-band
(Continued)

scan. In further examples, the information includes an indication of channels used by recognized nearby access points.

21 Claims, 9 Drawing Sheets

(51) Int. Cl.
*H04B 17/318* (2015.01)
*H04W 48/16* (2009.01)
*H04W 74/08* (2009.01)
*H04W 4/80* (2018.01)

(52) U.S. Cl.
CPC . *H04W 74/0816* (2013.01); *H04B 2001/7154* (2013.01); *H04W 4/80* (2018.02)

(58) Field of Classification Search
USPC ........................................................ 375/132
See application file for complete search history.

(56) References Cited

U.S. PATENT DOCUMENTS

| 2008/0219323 | A1 | 9/2008 | Desai et al. |
| 2011/0045771 | A1 | 2/2011 | Sen et al. |
| 2014/0187237 | A1* | 7/2014 | Li ................ H04W 16/14 455/424 |
| 2014/0334396 | A1* | 11/2014 | Lee ................ H04L 5/0062 370/329 |
| 2016/0183282 | A1* | 6/2016 | Balaban ............ H04W 72/1226 370/329 |
| 2017/0134882 | A1 | 5/2017 | Kao et al. |
| 2017/0245285 | A1* | 8/2017 | Palin ................ H04W 28/0236 |
| 2018/0026674 | A1* | 1/2018 | Lim ................ H04W 84/20 370/338 |
| 2018/0048350 | A1* | 2/2018 | Hammerschmidt . H04B 1/7156 |

\* cited by examiner

Fig. 9

EXTERNAL INFORMATION ASSISTANT CHANNEL ASSESSMENT FOR BLUETOOTH ADAPTIVE FREQUENCY HOPPING

CROSS-REFERENCE TO RELATED APPLICATION

This application is a national phase entry under 35 U.S.C. § 371 of International Application No. PCT/US2019/060928, filed Nov. 12, 2019, the entire disclosure of which is incorporated herein by reference.

BACKGROUND

Bluetooth® (BT) technology uses channel hopping to avoid interference from other BT devices and other radios such as WiFi® and other wireless communication in the 2.4 GHz frequency band. A first device wireless paired with a second device over a BT connection usually will listen on the channels which are not in an actively used channel set for the connection to decide whether there is some interference on those specific channels. However this approach will consume more system power, because a BT radio of the first device needs to be turned on when no scheduled packet is expected.

Some devices use a very simple adaptive frequency hopping (AFH) channel assessment algorithm. Such devices cannot do idle channel quality assessment due to hardware limitations. Rather, these devices randomly select channels back to the AFH channel pool, even if some channels are under the influence of environmental interference or have otherwise insufficient quality for exchanging BT packets reliably.

One known method of AFH channel assessment is to only assess a packet error rate (PER) in the active channels. If PER on a given channel is higher than a threshold, the given channel will be classified as a bad channel. Bad channels will be removed from an active channel map in a next AFH channel map update and put into a bad channel pool. When a total number of usable channels in the channel map channel assessment is less than 20 channels, a random channel from the bad channel pool will be selected and restored for use as a good channel. Since channel quality of the selected channel from the bad channel pool is not assessed, the selected channel may be jammed by other interference. In other words, the channel selection performance is unpredictable.

Another known method also only assesses PER in the active channels. If PER on a channel is higher than a threshold, the channel will be classified as bad channel and will be removed from active channel map in the next AFH channel map update. Channels that haven't been used in the past X seconds will be restored to the channel map without any further assessment. As such, the channel quality assessment criteria is only time, as opposed to the real channel quality itself. If after X seconds, the interference is still there, taking back those channels to use will have high potential to cause BT packet loss.

According to another known method, the BT radio of the device listens to every unused channel for channel quality assessment at predefined intervals to get more accurate channel interference assessment. This method consumes a significant amount of power.

BRIEF SUMMARY

The present disclosure provides a system and method for using information from a first wireless connection to mitigate interference on a second wireless connection.

One aspect of the disclosure provides method of generating a channel map for communication between accessories in a fully wireless system, the method including receiving, at a primary accessory, information from a host device, the information relating to communications between the host device and at least one second device. The method further includes determining, with one or more processors at the primary accessory, based on the received information, communication channels to avoid for communications between the primary accessory and a secondary accessory, generating, with the one or more processors, a communication channel map based on the determined communication channels to avoid, and providing, by the primary accessory, the communication channel map to the secondary accessory.

Another aspect of the disclosure provides a wireless accessory configured to operate as a primary wireless accessory. The wireless accessory includes one or more transceivers for communicating with at least a host device and a secondary wireless accessory, and one or more processors configured to receive information from the host device, the information relating to communications between the host device and at least one second device, determine, based on the received information, communication channels to avoid for communications between the primary accessory and a secondary accessory, generate a communication channel map based on the determined communication channels to avoid, and provide the communication channel map to the secondary accessory.

Yet another aspect of the disclosure provides a host device configured to wirelessly communicate with a primary wireless accessory. The host device includes one or more transceivers for communicating with the primary wireless accessory using a first protocol and with at least one second device using a second protocol, and one or more processors in communication with the transceivers. The one or more processors are configured to determine communication channels for the second protocol that will cause interference with the first protocol, generate information for the primary accessory, the information relating to the determined communication channels, for avoidance of the determined communication channels for communications between the primary accessory and a secondary accessory, and provide the information to the primary accessory.

DETAILED DESCRIPTION

Figure 1:
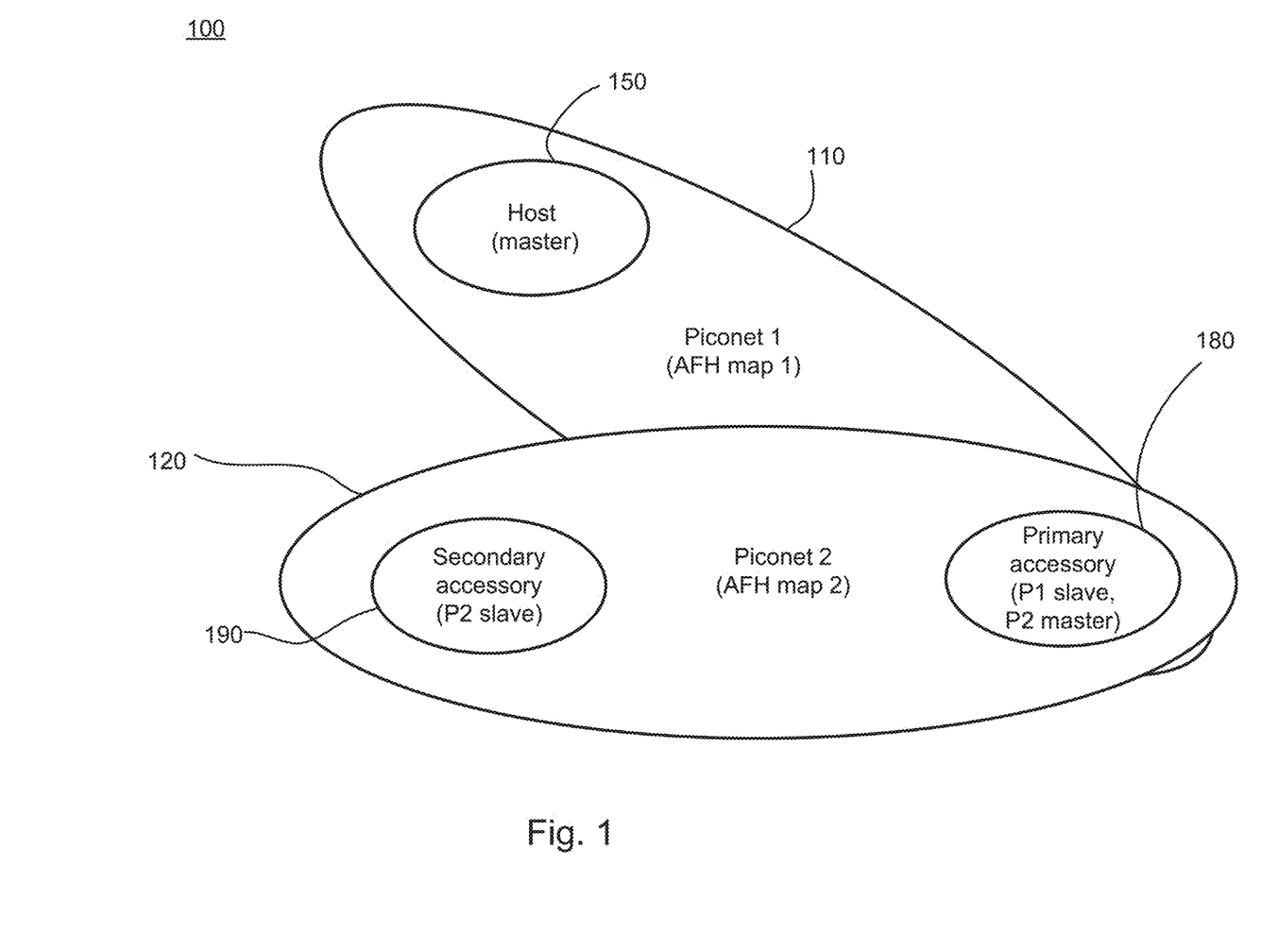
FIG. 1 illustrates an example fully wireless system in accordance with aspects of the disclosure.

FIG. 1 illustrates an example of a fully wireless system 100, including two piconets 110, 120. First piconet 110 includes a host device 150 and a primary accessory 180. Second piconet 120 includes the primary accessory 180 and secondary accessory 190. The host device 150 may be, for example, a phone, tablet, gaming system, or any of a variety of other types of computing devices capable of wireless communication with another device. The primary and secondary accessories 180, 190 may be a same type of device as one another, such as earbuds, audio devices for a true wireless system headset, video displays, speakers, etc. According to other examples, the primary accessory 180 may be a first type of device while the secondary accessory 190 is a second type. For example, the primary accessory 180 may be a smartwatch, headset, virtual reality display, home assistant, etc., while the secondary accessory 190 may be an audio device, smartglasses, etc. While several examples of wireless accessories are described, it should be understood that each of the primary and secondary accessories 180, 190 may be any type of wireless device.

The host 150 and the primary accessory 180 are wirelessly coupled, for example, via Bluetooth or other wireless pairing or communication link. In the first piconet 110, the host 150 serves as the master and the primary accessory 180 serves as the slave. For example, the host 150 may transmit audio, video, data, or other types of packets to the primary accessory 180. In this regard, the host device 150 is responsible for providing the channel map for the primary accessory 180 to follow. For example, the host 150 and primary accessory 180 may utilize adaptive frequency hopping (AFH) in their communication. As such, the host 150 would provide the AFH channel map for the primary accessory 180 to follow.

Figure 2:
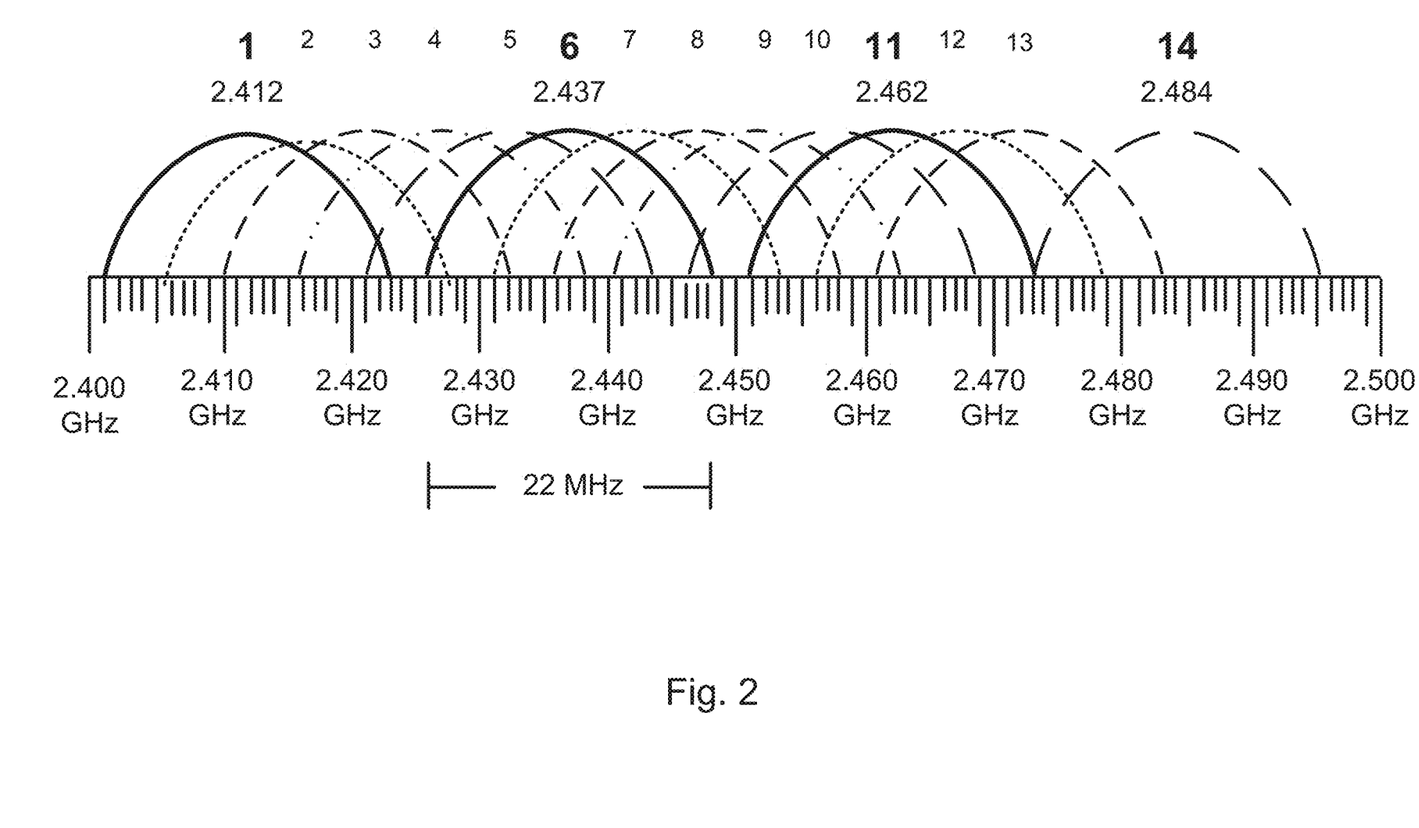
FIG. 2 illustrates an example wireless interference channel map according to aspects of the disclosure.

FIG. 2 illustrates an example channel map 200. The channel map of this example is a WiFi channel map in the 2.4 GHz band. WiFi access points operating in 2.4 GHz typically use channel 1, channel 6, or channel 11. When a particular WiFi channel is in use, it may create interference for a Bluetooth connection in the same frequency range. Accordingly, devices communicating over Bluetooth may avoid WiFi channels that are in use. For example, if the host device 150 of FIG. 1 is communicating over WiFi channel 1, it may only utilize frequencies of 2.425 GHz and above for Bluetooth communication with the primary accessory 180.

Returning to FIG. 1, in response to receiving packets from the host 150, the primary accessory 180 may in turn may output content from the packets received from the host 150, and may further relay the packets to secondary accessory 190. The primary accessory 180 and the secondary accessory 190 are wirelessly coupled in the second piconet 120, such as by a Bluetooth connection or other wireless connection separate from the connection of the first piconet 110. In the second piconet 120, the primary accessory 180 serves as the master with respect to the secondary accessory 190, and the secondary accessory 190 serves as the slave. Accordingly, the primary accessory 180 is responsible for generating the channel map for use in the second piconet 120.

In this topology, the primary accessory 180 is in a scatternet situation, because it operates as the slave in the first piconet 110 and the master in second piconet 120. As the slave in the first piconet 110, the primary accessory 180 follows the host device 150 for the AFH channel map. As the master in the second piconet 120, the primary accessory 180 defines the AFH channel map and sends it over to the secondary accessory 190 to follow.

Smaller accessories, such as earbuds, have very little room for internal electronics, such as processors, batteries, circuitry, etc. Therefore, such smaller accessories may be limited in particular functions, such as channel quality assessment. Host devices, such as mobile phones for example, are typically larger in size than the accessories, and may have larger batteries and more powerful processors. Therefore, the host device 150 may be configured with superior capability for channel assessment, as compared with the accessories 180, 190. As such, the primary accessory 180 may generate the channel map for the second piconet 120 using information received from the host 150.

Figure 3:
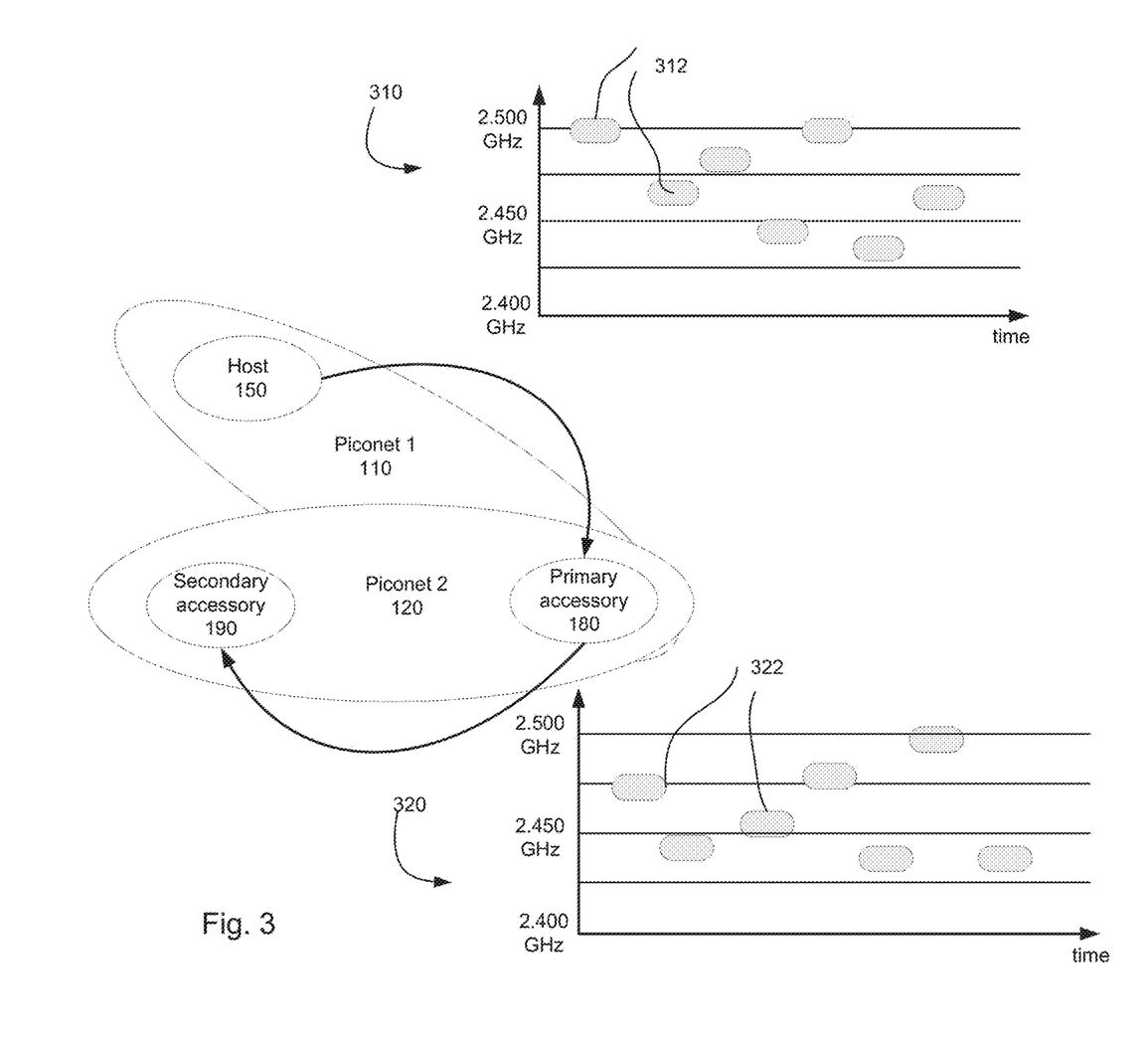
FIG. 3 illustrates an example of generating adaptive frequency hopping (AFH) channel map by a primary accessory according to aspects of the disclosure.

FIG. 3 illustrates a first method in which the primary accessory 180 may generate a channel map for use in the second piconet 120. In operation, the host device 150 and the primary accessory 180 may be close enough to each other that an interference channel observed by the host device 150 in the first piconet 110 should be similar to the interference channel that the primary accessory 180 is experiencing in the second piconet 120. The primary accessory 180 may observe first AFH channel map 310 used by the host device 150 in the first piconet 110. Using the first AFH channel map 310, the primary accessory 180 may indirectly determine whether interference exists on one or more particular channels. For example, as shown in FIG. 3, the first AFH map 310 includes a plurality of scheduled transmissions 312 at different frequencies over time. However, there are no transmissions 312 scheduled in the frequency range between 2.4 GHz and 2.425 GHz. Accordingly, the primary accessory 180 can infer that there is interference in that range, such as from the host device 150 utilizing WiFi channel 1 (FIG. 2).

The primary accessory 180 can avoid using the one or more particular channels in the second piconet 120 if the one or more particular channels are experiencing interference in the first piconet 110. For example, the primary accessory 180 can generate second AFH channel map 320 for use in the second piconet 120. Similar to the first AFH channel map 310, the second AFH map 320 includes a plurality of scheduled transmissions 322 at different frequencies at different times. Because the primary accessory 180 inferred from the first AFH map 310 that there is interference between 2.400-2.425 GHz, the primary accessory 180 does not schedule transmissions over that frequency range in the second AFH map 320.

This method may be utilized in a variety of true wireless system architectures. For example, it may be effective in relay-based, snoop-based, relay-plus-snoop mixed mode based, or other potential architectures. In the snoop-based architecture, since the secondary accessory is sniffing, it will use the same AFH map as the primary accessory.

The primary accessory 180 may periodically assess channel quality, and if necessary, generate a new channel map. When the primary accessory 180 is performing channel quality assessment to form a new channel map, it should use the latest AFH channel map from the first piconet 110 to determine potential interference.

Figure 4:
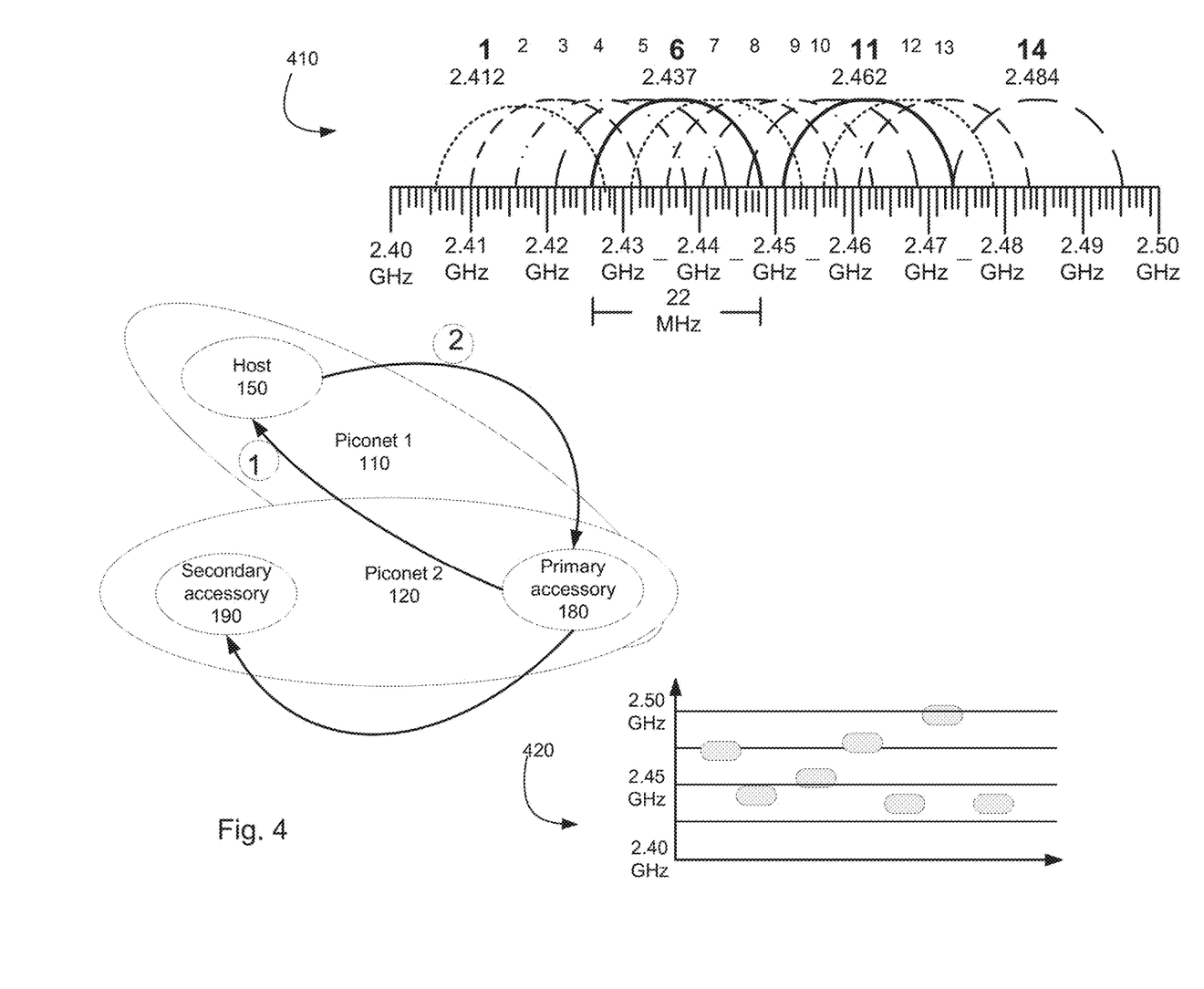
FIG. 4 illustrates another example of generating an AFH channel map by a primary accessory according to aspects of the disclosure.

FIG. 4 illustrates another method for improving AFH channel assessment. The primary accessory 180 asks the host device 150 to calculate the channel map. For example, the primary accessory 180 can ask the host device 150 to more aggressively scan for out-of-connection channel assessment and report back its results.

The request, indicated by arrow (1) in FIG. 4, may be a signal or packet with one or more bits indicating that the primary accessory 180 is requesting a channel assessment. According to other examples, the request may be more complex. For example, the request may specify that it is seeking a report for a particular channel, or the request may specify other information. The request may be sent at predetermined intervals, or any time the primary accessory 180 should update its AFH channel map. For example, the primary accessory 180 may send the request to the host 150 when signal quality in the second piconet 120 falls below a predetermined threshold.

In response to the request, the host 150 may perform a channel assessment and transmit a report, indicated by arrow (2), back to the primary accessory 180. The assessment may include, for example, a scan of out-of-band channels to determine which channels are available and which channels have interference. The report may take a variety of forms. For example, the report may be a listing of channels along with a corresponding signal quality for each channel. As another example, the report may take the form of channel map 410. For example, the map 410 may list available channels, and omit channels that have interference, such as channel 1. The channel assessment may be performed using the host device's Bluetooth controller or a separate piece of hardware.

Once the primary accessory 180 receives the channel assessment report, it may generate AFH channel map 420 based on the information. Accordingly, the primary accessory 180 may use the AFH channel map 420 for communication in the second piconet 120. This offloads power consumption from the primary accessory to the host device.

Figure 5:
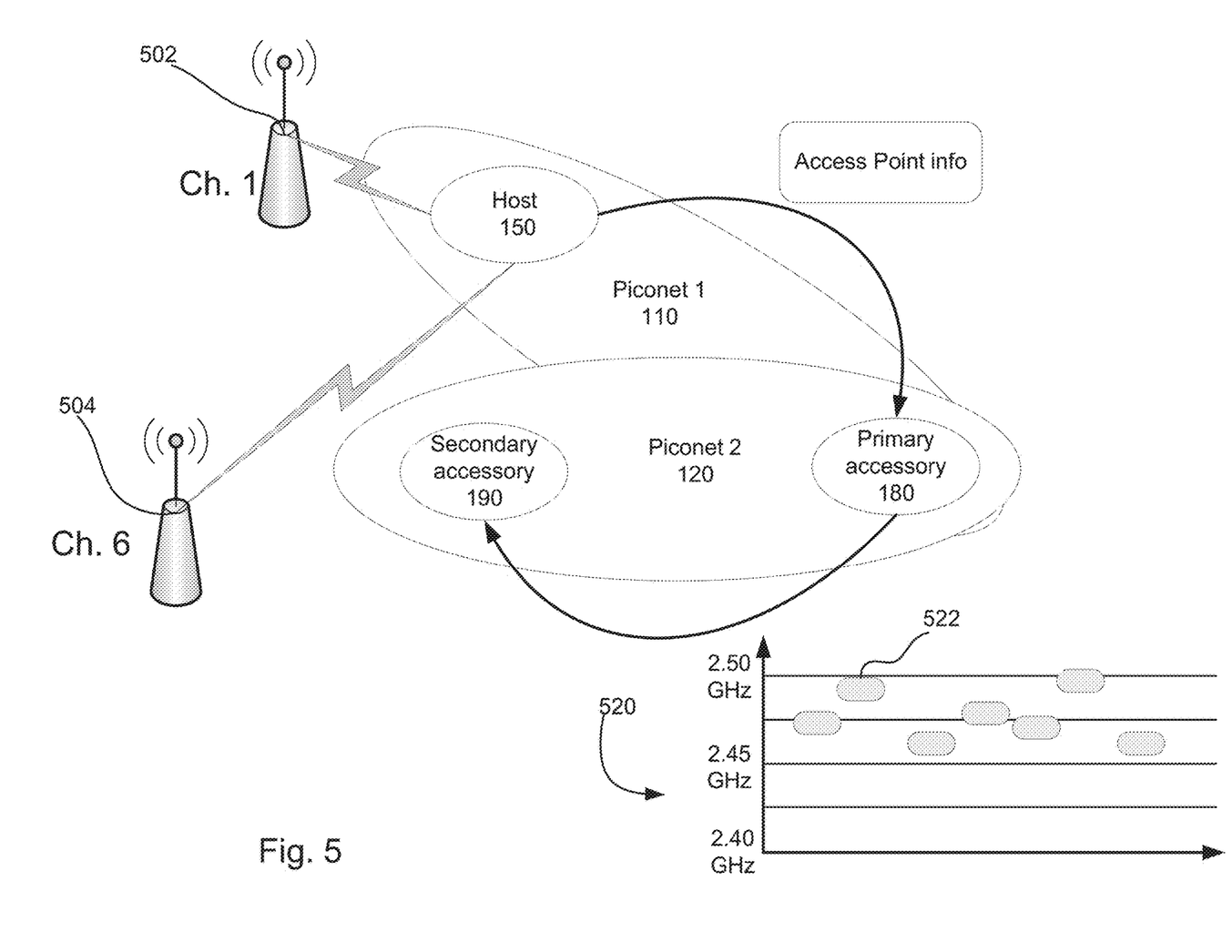
FIG. 5 illustrates another example of generating an AFH channel map by a primary accessory according to aspects of the disclosure.

FIG. 5 illustrates yet another example of improving AFH channel assessment, wherein information from the host device 150 is used to provide an indication to the primary accessory 180 regarding which channels are good or had. For example, WiFi access points (APs) 502, 504 communicate with the host device 150. The APs 502, 504 may have fixed positions in the environment and fixed channels after deployment. For example, as shown, the AP 502 utilizes WiFi channel 1, while the AP 504 utilized the WiFi channel 6. The host device 150 may communicate information regarding the APs 502, 504 to the primary accessory 180. For example, such information may include an AP identifier, location, channel in use, etc.

A traffic load on one or both of the APs 502, 504 can change, which will have an impact on the channel map assessment. However, if the accessories have enough "good" channels to use outside of the fixed and known AP channels, the accessories can block those channels. For example, the primary accessory 180 may generate an AFH map 520 that avoids transmissions 522 on frequency ranges that coincide with WiFi channel 1 and WiFi channel 6 since those are in use by the APs 502, 504 to which the host 150 is attached. This avoids potential harm to the Bluetooth traffic when the WiFi traffic suddenly comes up during Bluetooth device communication.

According to yet another method, a Bluetooth Low Energy (BLE) channel map may be used to increase the channel assessment opportunity when using the channel assessment method of only using active channel for channel quality evaluation. For example, the same primary device can communicate with host device through both Bluetooth and BLE. Bluetooth and BLE traffic share the air medium. By using traffic on both links to do channel assessment, there is an increased opportunity to assess the channel quality as compared to using one type of traffic.

In some systems, a combination of some or all of the methods described above can be used together to enhance overall system performance. For example, the primary accessory 180 may use various different types of information from the host device 150 to determine channels that likely have interference and to avoid such channels in generating an AFH map for use in the second piconet 120.

Figure 6:
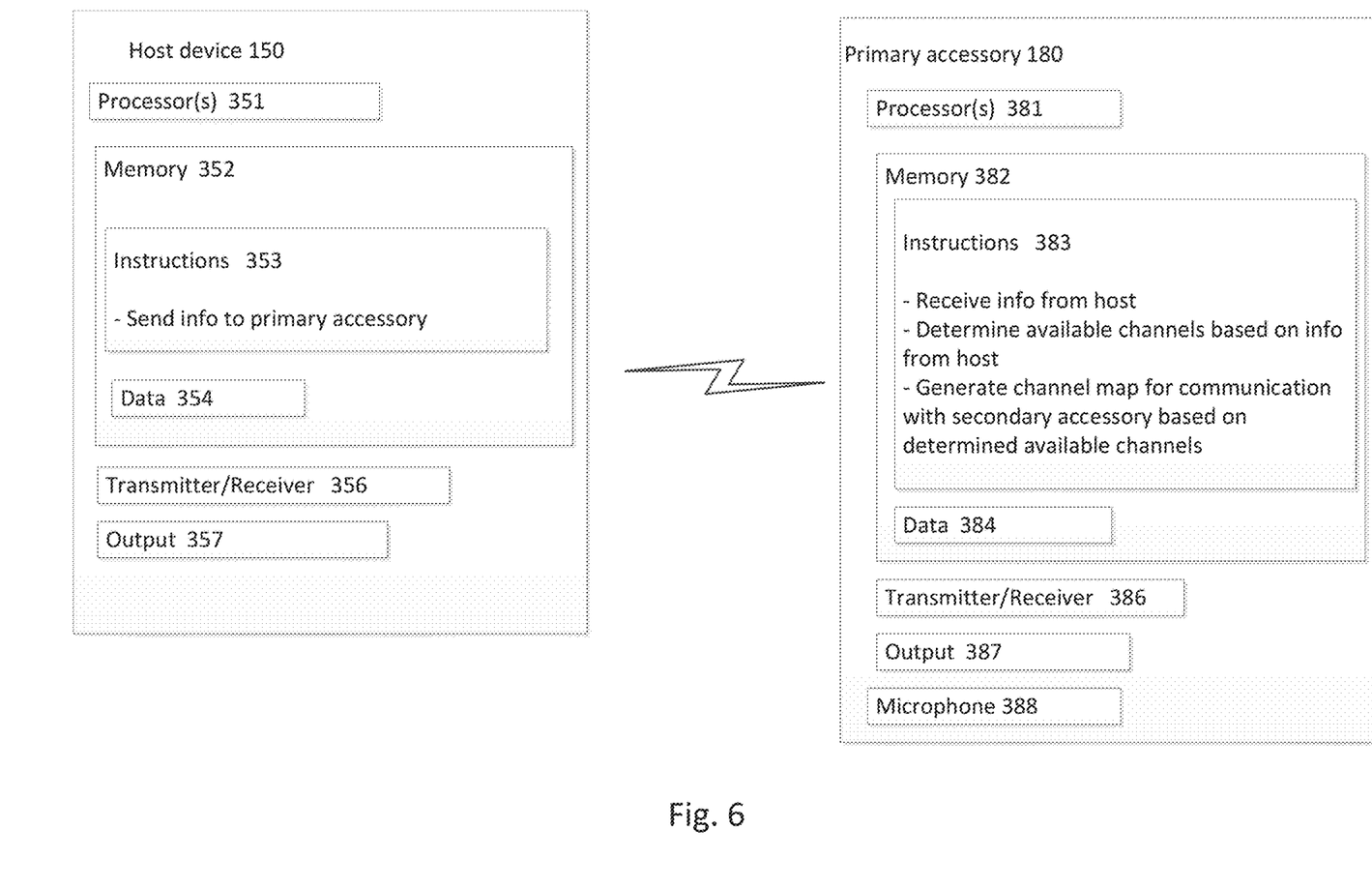
FIG. 6 is a block diagram of an example primary accessory in a fully wireless system according to aspects of the disclosure.

FIG. 6 provides an example block diagram of the primary accessory 180 and the host device 150. The primary accessory 180 can be any of various types of wireless devices, such as earbuds, head-mounted devices, smartwatches, etc., that is configured to communicate with both the host device 150 and a secondary accessory. The primary accessory 180 includes one or more processors 381, memory 382, and other components typically present in audio playback devices and auxiliary devices. While a number of components are shown, it should be understood that such components are merely non-limiting examples, and that other components may additionally or alternatively be included.

The one or more processors 381 may be any conventional processors, such as commercially available microprocessors. Alternatively, the one or more processors may be a dedicated device such as an application specific integrated circuit (ASIC) or other hardware-based processor. Although FIG. 6 functionally illustrates the processor, memory, and other elements of wireless accessory 180 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the accessory device 180. Accordingly, references to a processor or computing device will be understood to include references to a collection of processors or computing devices or memories that may or may not operate in parallel.

Memory 382 may store information that is accessible by the processors 381, including instructions 383 that may be executed by the processors 381, and data 384. The memory 382 may be of a type of memory operative to store information accessible by the processors 381, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 383 and data 384 are stored on different types of media.

Data 384 may be retrieved, stored or modified by processors 381 in accordance with the instructions 383. For instance, although the present disclosure is not limited by a particular data structure, the data 384 may be stored in computer registers, in a relational database as a table having a plurality of different fields and records, XML documents, or flat files. The data 384 may also be formatted in a computer-readable format such as, but not limited to, binary values, ASCII or Unicode. By further way of example only, the data 384 may be stored as bitmaps comprised of pixels that are stored in compressed or uncompressed, or various image formats (e.g., JPEG), vector-based formats (e.g., SVG) or computer instructions for drawing graphics. Moreover, the data 384 may comprise information sufficient to identify the relevant information, such as numbers, descriptive text, proprietary codes, pointers, references to data stored in other memories (including other network locations) or information that is used by a function to calculate the relevant data.

The instructions 383 may be executed to receive information from the host 150, determine available communications based on the information from the host, and generate a channel map for use in the second piconet based on the determined available channels.

The host device 150 may also include a processor 351 and memory 352, including instructions 353 executable by the processor 351 and data 354. The memory 352 may be any of a variety of types, and the data 354 may be any of a variety of formats, similar to the memory 382 and data 384 of the primary accessory 180. The instructions 353 may provide for sending information to the primary accessory 180. For example, such information may include an AFH channel map, as a host would typically send to a primary accessory in a fully wireless system. According to other examples, such information may include additional information collected, such as at the request of the primary accessory 180, such as a report of an out-of-band channel scan, or information regarding access points which the host 150 sees or is connected to. While the example of FIG. 3 illustrates a particular set of operations in each set of instructions, it should be understood that either device may be capable of executing additional or other instructions.

Each of the primary accessory 180 and the host 150 may include other components typically found in such devices, such as transmitter/receivers 356, 386, output 357, 387 such as displays, speakers, tactile feedback, etc., input such as microphone 388 or other input, etc. It should be understood that the primary accessory 180 and host device 150 may each include other components which are not shown but may be utilized in execution of the instructions 383, 353. For example, the host 150 may include hardware for scanning available channels and reporting to the primary accessory 180.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
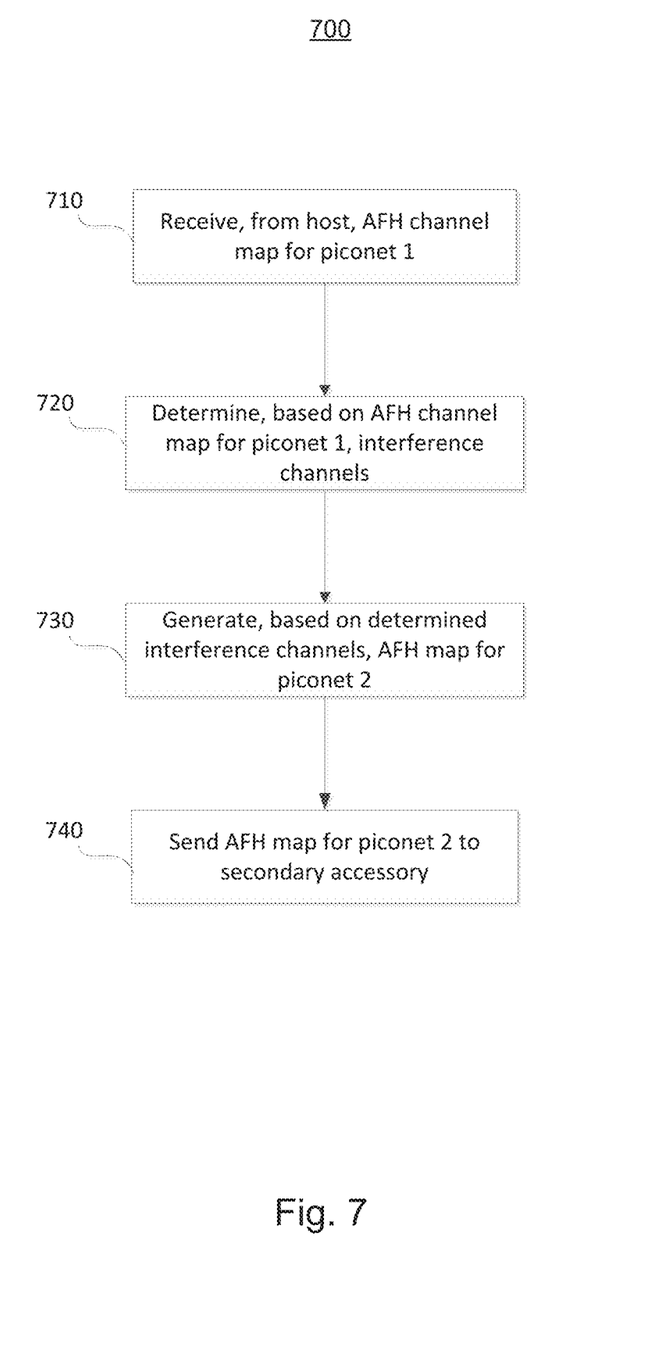
FIG. 7 is a flow diagram illustrating an example method according to aspects of the disclosure.

FIG. 7 illustrates an example method 700 for efficient generation of a channel map by a primary accessory in a fully wireless system, similar to the example illustrated in FIG. 3. In block 710, the primary accessory receives, from the host, an AFH channel map for a first piconet in which the host serves as the master and the primary accessory serves as the slave.

In block 720, the primary accessory determines, based on the received channel map for the first piconet, which channels have interference that may affect communications in a second piconet where the primary accessory is the master and a secondary accessory is the slave. For example, the primary accessory may recognize that the received channel map omits a particular range of frequencies, and instead only schedules communications on other frequency ranges. The primary accessory may therefore infer that the omitted range of frequencies has interference that was detected by the host. For example, such interference may include a WiFi channel on which the host is communicating.

In block 730, the primary accessory generates a channel map for the second piconet based on the determined interference channels. For example, the channel map may be an AFH channel map which omits the same frequency range that was omitted in the map received from the host. The map may be generated using further information known to the primary accessory as well. In block 740, the primary accessory sends the channel map to the secondary accessory for communication in the second piconet.

Figure 8:
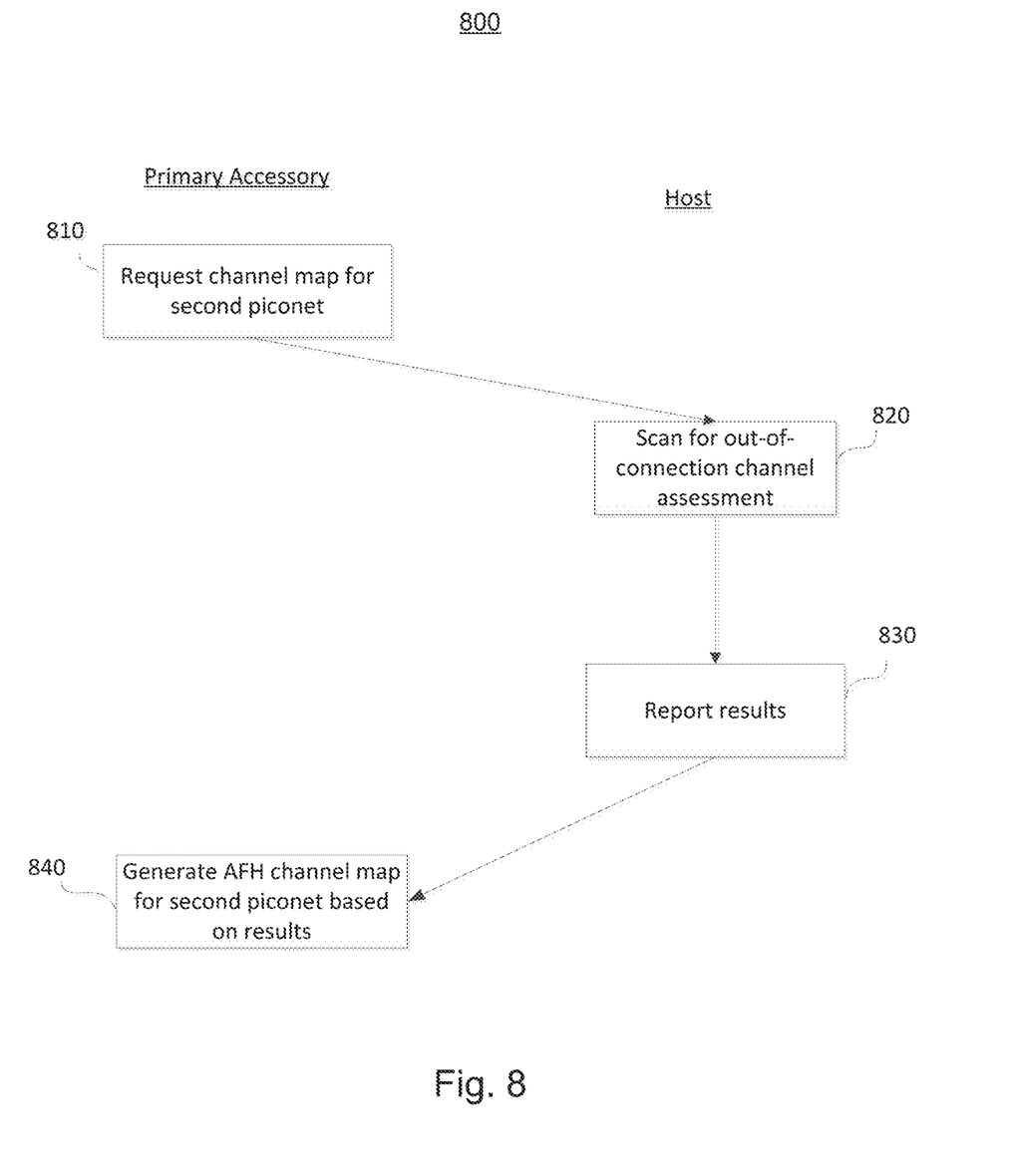
FIG. 8 is a flow diagram illustrating another example method according to aspects of the disclosure.

FIG. 8 illustrates another method 800, such as that described above in connection with FIG. 4. According to this method 800, the primary accessory sends a request (block 810) to the host for a channel map for the second piconet. In this regard, the primary accessory transfers responsibility for generating the map to the host device, which has more processing and power capabilities. As such, the primary accessory saves its own battery and processing power.

In block 820, the host performs a channel assessment, such as an out-of-band scan for interference that may affect the communications between the primary accessory and the secondary accessory in the second piconet. The assessment may detect available channels, channels with interference, or other conditions that may produce interference on particular channels.

In block 830, the host reports the results of the channel assessment to the primary accessory. For example, the host may send to the primary accessory a list of available channels, a list of channels on which the primary accessory may experience interference, or a list of all channels with corresponding information indicating whether or not interference may exist. In block 840, the primary accessory generates a channel map for the second piconet based on the report received from the host.

Figure 9:
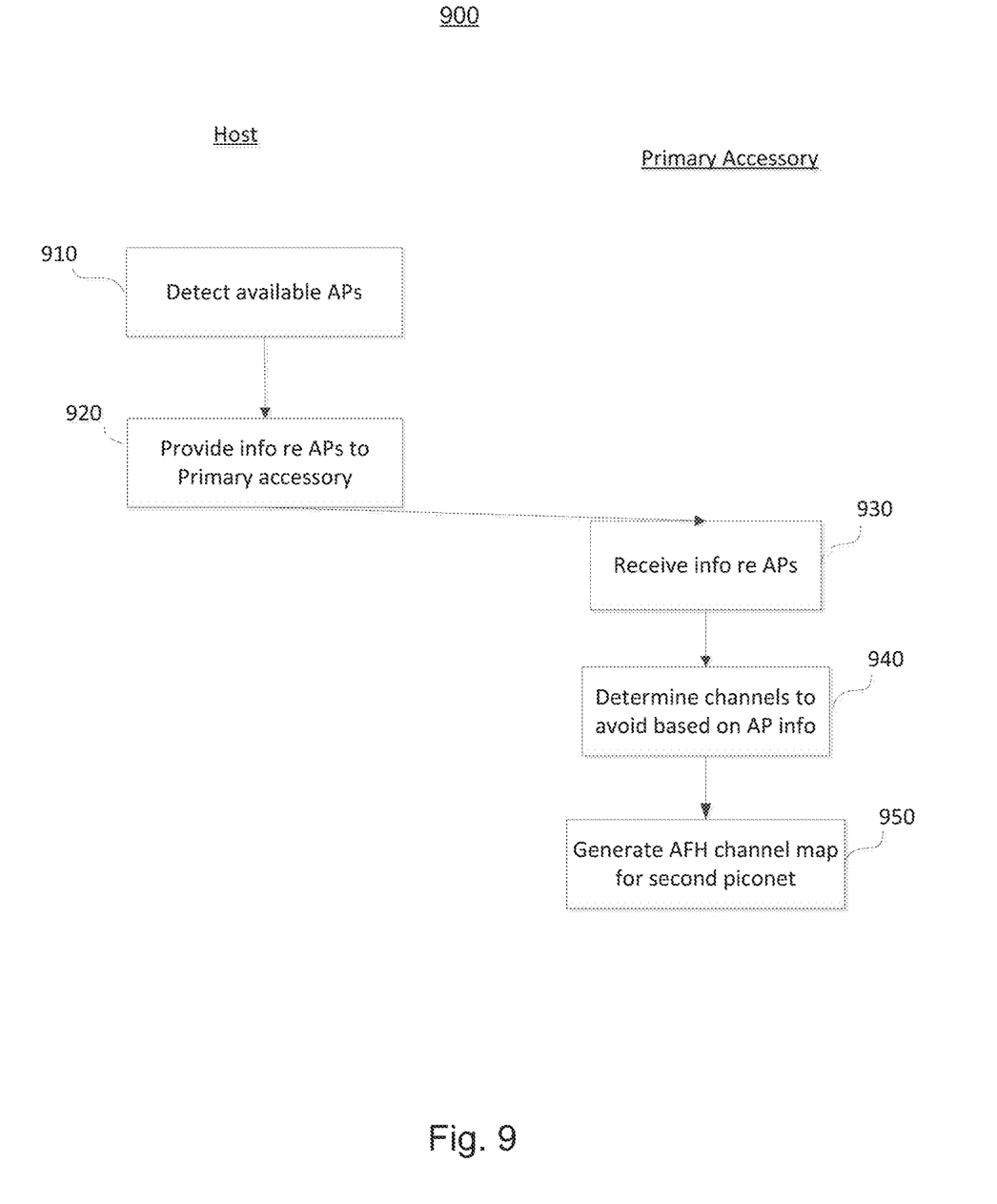
FIG. 9 is a flow diagram illustrating another example method according to aspects of the disclosure.

FIG. 9 illustrates yet another example method 900, corresponding to the illustration of FIG. 5, where generating the map for the second piconet takes into consideration other information from the host, such as nearby AP information.

In block 910, the host detects one or more available APs. For example, the host may detect one or more nearby APs and detect channels on which the nearby APs are transmitting. The host device may be connected to the APs, such that it uses the APs to wirelessly transmit or receive information over a network, such as the Internet. According to other examples, the host device may merely recognize the nearby APs without attaching.

In block 920, the host device provides information regarding the detected APs to the primary accessory. For example, the host device may provide a list of detected APs or a list of communication channels on which the detected APs are deployed. According to some examples, the information may include further details, such as identifiers of the APs, location of the APs, signal strength between the APs and the host, etc.

In block 930, the primary accessory receives the information regarding the APs. In block 940, the primary accessory determines channels to avoid based on the AP information. For example, the primary accessory may determine to avoid all channels on which the detected APs are deployed, to prevent potential interference. According to other examples, the primary accessory may avoid only selected APs, such as those serving a greatest amount of traffic, those with the greatest signal strength, etc. Whether to avoid some or all of the AP channels may depend, for example, on how many APs are detected or how many channels in Bluetooth communication range are occupied by the APs. In block 950, the primary accessory generates a channel map for the second piconet based on the determined channels to be avoided.

While a number of different methods have been described above, it should be understood that a combination of some or all of these methods may be used together to efficiently generate a channel map for communications between a primary accessory and a secondary accessory in a fully wireless system.

The foregoing techniques may be advantageous in that they provide for efficiently generating channel maps for use between fully wireless accessories. Resources, such as power and processing capabilities, may be conserved by making inferences based on information received from the host. In some examples, responsibilities may be shifted from the primary accessory to the host, thereby shifting consumption of the resources.

While the foregoing examples were primarily described with respect to avoiding interference between WiFi channels and Bluetooth communications, it should be understood that the concepts may be applied to any of a variety of communication protocols which may cause interference with one another.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of generating a channel map for communication between accessories in a fully wireless system, the method comprising:
   receiving, at a primary accessory, information from a host device, the information relating to communications between the host device and at least one second device;
   determining, with one or more processors at the primary accessory, based on the received information, communication channels to avoid for communications between the primary accessory and a secondary accessory;
   generating, with the one or more processors, a communication channel map based on the determined communication channels to avoid; and
   providing, by the primary accessory, the communication channel map to the secondary accessory.

2. The method of claim 1, wherein the information received from the host devices comprises a first adaptive frequency hopping (AFH) channel map for communications between the host device and the primary accessory.

3. The method of claim 2, wherein determining the communication channels to avoid comprises identifying a range of frequencies for which there are no scheduled transmissions in the first AFH channel map.

4. The method of claim 1, further comprising requesting, by the primary accessory, a channel assessment by the host device.

5. The method of claim 4, wherein the information received from the host device includes a report of the channel assessment.

6. The method of claim 4, wherein the information received from the host device comprises a second adaptive frequency hopping (AFH) channel map, generated by the host device based on the channel assessment, for communications between the primary accessory and the secondary accessory.

7. The method of claim 1, wherein the information comprises an indication of one or more channels on which access points detected by the host device are deployed.

8. The method of claim 7, wherein the information further comprises an indication of signal strength for each of the access points.

9. The method of claim 7, wherein determining the communication channels to avoid comprises determining the channels on which the detected access points are deployed.

10. A wireless accessory configured to operate as a primary wireless accessory, comprising:
    one or more transceivers for communicating with at least a host device and a secondary wireless accessory;
    one or more processors configured to:
    receive information from the host device, the information relating to communications between the host device and at least one second device;
    determine, based on the received information, communication channels to avoid for communications between the primary accessory and a secondary accessory;
    generate a communication channel map based on the determined communication channels to avoid; and
    provide the communication channel map to the secondary accessory.

11. The accessory of claim 10, wherein the information received from the host devices comprises a first adaptive frequency hopping (AFH) channel map for communications between the host device and the primary accessory.

12. The accessory of claim 11, wherein determining the communication channels to avoid comprises identifying a range of frequencies for which there are no scheduled transmissions in the first AFH channel map.

13. The accessory of claim 10, further comprising requesting, by the primary accessory, a channel assessment by the host device.

14. The accessory of claim 13, wherein the information received from the host device includes a report of the channel assessment.

15. The accessory of claim 13, wherein the information received from the host device comprises a second adaptive frequency hopping (AFH) channel map, generated by the host device based on the channel assessment, for communications between the primary accessory and the secondary accessory.

16. The accessory of claim 10, wherein the information comprises an indication of one or more channels on which access points detected by the host device are deployed.

17. The accessory of claim 16, wherein the information further comprises an indication of signal strength for each of the access points.

18. The accessory of claim 16, wherein determining the communication channels to avoid comprises determining the channels on which the detected access points are deployed.

19. A host device configured to wirelessly communicate with a primary wireless accessory, the host device comprising:
    one or more transceivers for communicating with the primary wireless accessory using a first protocol and with at least one second device using a second protocol;
    one or more processors configured to:
    determine communication channels for the second protocol that will cause interference with the first protocol;

generate information for the primary accessory, the information relating to the determined communication channels, for avoidance of the determined communication channels for communications between the primary accessory and a secondary accessory; and provide the information to the primary accessory.

20. The host device of claim 19, wherein generating the information comprises generating a communication channel map based on the determined communication channels.

21. The host device of claim 19, wherein determining the communication channels for the second protocol that will cause interference comprises performing an out-of-band communication scan.

* * * * *